Patented Feb. 5, 1952

2,584,344

UNITED STATES PATENT OFFICE 2,584,344

REACTING SILOXANE WITH GLYCERINE-DICARBOXYLIC ACID ESTER AND THEREAFTER WITH DICARBOXYLIC ACID

John T. Goodwin, Jr., and Melvin J. Hunter, Midland, Mich., assignors to Dow Corning Corporation, Midland, Mich., a corporation of Michigan No Drawing. Application January 7, 1950,
Serial No. 137,475

2 Claims. (Cl. 260—45.4)

This invention relates to resinous thermosetting compositions of matter.

The copending application of Melvin J. Hunter et al., Serial No. 59,414, filed November 10, 1948, discloses and claims resin compositions prepared by reacting a silane of the formula $R_nSiX_{4-n}$ with a polyhydric alcohol and thereafter reacting the product with a polybasic acid. Resins prepared in this manner are of great utility as coating compositions, such as for example, paint vehicles and wire enamels. However, only a limited range of compositions can be prepared by this method due to incompatibility.

It is an object of this invention to prepare resinous materials which combine exceptional heat stability and toughness to a degree heretofore unknown.

In accordance with this invention a polysiloxane containing from 0.9 to 2.1 monovalent hydrocarbon radicals per silicon atom and from .05 to 2 alkoxy or acyloxy radicals per silicon atom, the remaining valences of the silicon being satisfied by oxygen atoms of an SiOSi linkage, is reacted with a glycerol ester. The glycerol ester is formed by reacting glycerine with an acidic compound of the group dicarboxylic acids or anhydrides thereof in amount such that the ratio of glycerine OH to acid groups is from 2.25:1 to 3:1. The polysiloxane and the glycerol ester are reacted in amount such that the ratio of the silane functional groups to glycerine hydroxyls in excess of the acid groups is from 0.1:1 to 0.28:1. The resulting siloxane-glycerine ester is then reacted with an additional amount of a dicarboxylic acid or anhydride thereof in amount such that the ratio of glycerine OH to the sum of the siloxane functional groups plus the total acid groups is from 0.9 to 1.2.

In this specification the term "siloxane functional group" has reference to alkoxy and acyloxy radicals which are bonded to the silicon of the polysiloxane. The term "acid groups" has reference to carboxyl and anhydride groups, it being understood that one anhydride group is equivalent to two carboxyl groups.

The polysiloxanes employed in the method of this invention are the partial hydrolyzates of silanes of the type $R_nSiX_{4-n}$, where R is a saturated aliphatic radical of less than seven carbon atoms or a monocyclic aryl radical, and X is alkoxy or chlorine, and $n$ has a value from 0.9 to 2.1.

When silanes of the above type are reacted with water in amount less than that sufficient to hydrolyze all of the X radicals, a partially condensed siloxane still containing hydrolyzable groups is obtained. Such partial hydrolyzates may be prepared by a variety of ways, such as reacting alkoxy silanes with less than the theoretical amount of water, or as is preferred for the purpose of this invention, by reacting a chlorosilane with an alcohol to produce an alkoxychlorosilane and thereafter preferentially removing the chlorines by reacting the silane with water in amount equivalent to the chlorine present. This method is more fully set forth in the copending application of Lawrence A. Rauner, Serial No. 137,480, filed concurrently herewith.

In the above method the chlorines, being more reactive than the alkoxy radicals, are preferentially removed, with the resulting condensation of the silane to form an alkoxylated polysiloxane. For the purposes of this invention the silicon-bonded alkoxy groups in the partial hydrolyzate range from .05 to 2 alkoxy groups per silicon atom. Any alkoxy group, such as for example, methoxy, isopropoxy, butoxy, and stearyloxy, may be employed.

It has been found that it is often desirable to employ polysiloxanes having acyloxy groups in the place of or together with alkoxy radicals. Such acyloxy polysiloxanes are best prepared by reacting the corresponding polysiloxanes with monocarboxylic acids. Reaction proceeds with the elimination of an alcohol and the replacement of the alkoxy radicals on the silicon with an acyloxy radical. Preferentially, the reaction is carried out at a temperature above the boiling point of the alcohol produced.

Resinous materials suitable for use as coating agents may be prepared from the above-defined polysiloxanes having any acyloxy group attached to the silicon. However, beneficial modifications of the resins are obtained when acyloxy groups containing at least seven carbon atoms are employed. These include, for example, benzoyloxy, 2-ethyl hexoyloxy, stearyloxy, and linoleyloxy. Thus, it can be seen that the hydrocarbon portion of the acyloxy group may be either monocyclic aryl, saturated aliphatic, or unsaturated aliphatic.

The glycerine esters employed herein are prepared by reacting glycerine with a dicarboxylic acid or anhydride thereof in amount such that the molar ratio of glycerine to the acidic compound is from 1.5 to 2. Hence there is always an excess of hydroxyls in the glycerine ester which are free to react with the functional groups of the polysiloxane.

The glycerine esters are prepared by reacting glycerine with a dicarboxylic acid of the formula HOOCRCOOH or anhydrides thereof. For the purposes of this invention any acid in which R is a divalent aryl radical or a divalent aliphatic radical may be employed. Examples of such acids are phthalic, malonic, maleic, and fumaric.

The reaction between the glycerine and the acidic compound is carried out in the conventional manner of preparing glycerides. Normally, in this invention the reaction is conducted at a temperature of about 200° C.

The glycerol esters employed herein are materials having a low degree of polymerization. Theoretically, the degree of polymerization is 2, and the materials would respond to the formula

HOCH₂CHOHCH₂OOCRCOOCH₂CHOHCH₂OH when the molar ratio of glycerine to acid is 2 and a mixture of the above and

HOCH₂CHOHCH₂OOCRCOOH when the molar ratio of glycerine to acid is between 2 and 1.5. The esters are liquids and are not resinous in character.

The polysiloxanes and the glycerol ester are reacted in amount such that the ratio of siloxane functional groups to glyceryl hydroxyls is from 0.1 to 1. The reaction is carried out preferably at a temperature between 100° C. and 250° C. Under these conditions any alcohol by-product is removed by distillation.

The reaction may be represented schematically by the equation

The glycerine-siloxane esters are fluid materials which are readily soluble in organic solvents such as aromatic hydrocarbons, alcohols, and ketones.

The glycerine-siloxane ester is then reacted with any of the above-defined acidic compounds in such amount that the ratio of glycerine OH to the sum of the siloxane functional groups plus the total acid groups is from 0.9 to 1.2. Thus, in the final resin there may be either an excess of OH radicals or an excess of carboxyl radicals, or the OH, acid groups, and siloxane functional groups may be present in equivalent amounts.

The reaction between the acidic compound and the siloxane-glycerine ester appears to proceed by two mechanisms. One is that of a straight condensation reaction between glycerine hydroxyls and acid groups. The other is that of splitting the SiOC linkages in the siloxane-glycerine ester, whereupon the acid becomes attached directly to a silicon. The latter reaction may be represented schematically by the equation

This reaction is readily observed when the ratio of silane functional groups to hydroxyls in the siloxane-glycerine ester is 1. In such cases there are essentially no unreacted hydroxyls to condense with the acid. Yet in spite of this, reaction proceeds smoothly, as is shown by a rapid decrease in the acid number and by the resinification of the product.

The reaction between the siloxane-glycerine ester and the acidic compound is carried out preferably at a temperature between 150° C. and 250° C. Under such conditions water is removed from the reaction mixture. The reaction is usually continued until the product shows signs of gelling, such as for example, wrapping around the stirrer. Usually the material is then dissolved in a solvent such as cyclohexanone, aromatic hydrocarbons, or ketones, in order to prevent the material from thermosetting in the reaction vessel. The resin solutions may be employed for coating base members.

If desired, the various reactions shown above may be carried out in solvents such as alcohols, ketones, and aromatic hydrocarbons.

The soluble resins prepared by the above manner are thermoset by further heating at temperatures up to 350° C. The cured resins make excellent coatings for high-temperature uses.

The materials of this invention have thermal stabilities approaching that of straight siloxane resins. For example, metal panels have been coated with the resin and the film cured. The cured film showed no detectable deterioration after twenty-four hours' heating at 250° C. The combination of thermal properties and stress-strain characteristics of the thermoset resins of this invention are such as to render the materials unique and able to meet specifications which are not satisfied by either organic resins, siloxane resins, or other siloxane-modified organic resins.

The following examples are illustrative only.

*Example 1*

To a mixture of 2290 grams of phenylmethyldichlorosilane and 1090 grams of phenyltrichlorosilane was added 1896 grams of isopropanol. During the addition of the isopropanol the temperature was maintained below 35° C. and HCl evolved. After addition of the alcohol was complete, 106 grams of water was added to the mixture at a temperature below 35° C. After addition of the water was complete, the material was refluxed to remove volatiles and then neutralized with sodium bicarbonate and filtered. The resulting product was a polysiloxane containing .92 isopropoxy groups per silicon atom and 1.7 methyl and phenyl groups per silicon atom.

74 grams of phthalic anhydride was reacted with 92 grams of glycerine by heating a mixture of the two at 200° C. until a homogeneous product was obtained. The resulting glycerol ester was then reacted with 152 grams of the above alkoxylated polysiloxane by heating a mixture of the two at a temperature of from 150° to 200° C. until substantially the theoretical amount of isopropyl alcohol was removed. 74 grams of phthalic anhydride was then added to the siloxane-glyceryl ester and the mixture was heated at a temperature between 170° C. and 210° C. until the reaction mixture began to wrap around the agitator. During the reaction water was evolved. The product was then dissolved in cyclohexanone.

The solution was applied to a tin surface and thereafter baked one hour at 200° C., whereupon a hard, flexible resin was obtained.

*Example 2*

152 grams of the alkoxylated polysiloxane of Example 1 was reacted with 87 grams of 2-ethyl hexoic acid at a temperature of 150° C. until substantially the theoretical amount of isopropyl alcohol was removed. The resulting product contained both isopropoxy radicals and 2-ethyl hexoyloxy radicals attached to silicon.

92 grams of glycerine was reacted with 74 grams of phthalic anhydride, and the resulting product was reacted with the polysiloxane in accordance with the procedure of Example 1. The resulting siloxane-glycerine ester was then reacted with 74 grams of phthalic anhydride in accordance with the above procedure.

A can lid was dipped into a cyclohexanone solution of this resin and thereafter heated at 200° C. for two hours. The resin cured to a hard, flexible, firmly adhering coat.

*Example 3*

When a polysiloxane containing .67 benzoyloxy groups per silicon atom and 1.5 phenyl and methyl radicals per silicon atom, said siloxane containing no alkoxy radicals, is reacted with a glyceryl phthalate ester, and the siloxane-glycerine ester so produced is reacted with an additional amount of phthalic anhydride in accordance with the procedure of Example 1, a thermosetting resin is obtained.

*Example 4*

A polysiloxane was prepared in accordance with the procedure of Example 1, using the following amounts of reactants: 634 grams of phenyltrichlorosilane, 383 grams of dimethyldichlorosilane, 600 grams of isopropyl alcohol, and 67.5 grams of water. The resulting polysiloxane contained .33 isopropoxy groups per silicon and 1.5 phenyl and methyl radicals per silicon atom.

184 grams of glycerine was reacted with 148 grams of phthalic anhydride at a temperature of 140° C. in the presence of benzene. 9 cc. of water azeotroped out with the solvent. The resulting glyceryl phthalate was reacted with 508 grams of the polysiloxane, and the product thereby obtained was reacted with 148 grams of phthalic anhydride, in accordance with the procedure of Example 1.

The resulting resin was heated on metal at 200° C. for one hour and produced a flexible, tough, firmly adherent coat.

That which is claimed is:

1. A method of preparing thermosetting resinous materials which comprises reacting a polysiloxane containing from 0.9 to 2.1 silicon-bonded monovalent hydrocarbon radicals per silicon atom, said radicals being selected from the group consisting of saturated aliphatic radicals of less than seven carbon atoms and monocyclic aryl radicals and from .05 to 2 silicon-bonded siloxane functional groups per silicon atom, said groups being selected from the group consisting of alkoxy and acyloxy radicals, said acyloxy radicals being of the formula RCOO— where R is a hydrocarbon radical, the remainder of the valences of the silicon being satisfied with oxygen atoms, with a glycerol ester formed by reacting glycerine with an acidic compound selected from the group consisting of dicarboxylic acids and anhydrides thereof in amount such that the ratio of glycerine OH to dicarboxylic acid groups is from 2.25:1 to 3:1, said polysiloxane and said glycerol ester being reacted in amount such that the ratio of silicon bonded siloxane functional groups to glycerine OH in excess of dicarboxylic acid groups is from 0.1:1 to 0.29:1, and thereafter reacting the siloxane-glycerine ester so formed with an additional amount of an acidic compound selected from the group consisting of dicarboxylic acids and anhydrides thereof in amount such that the ratio of glycerine OH to the sum of the silicon bonded siloxane functional groups plus the total dicarboxylic acid groups is from 0.9 to 1.2.

2. The method in accordance with claim 1 in which the monovalent hydrocarbon radicals are phenyl and methyl radicals.

JOHN T. GOODWIN, Jr.
MELVIN J. HUNTER.

REFERENCES CITED

The following references are of record in the file of this patent:

UNITED STATES PATENTS

| Number | Name | Date |
| --- | --- | --- |
| 2,386,793 | Hanford | Oct. 16, 1945 |
| 2,395,550 | Iler et al. | Feb. 26, 1946 |
| 2,426,121 | Rust et al. | Aug. 19, 1947 |
| 2,529,956 | Myles et al. | Nov. 14, 1950 |

FOREIGN PATENTS

| Number | Country | Date |
| --- | --- | --- |
| 583,754 | Great Britain | Dec. 30, 1946 |